Feb. 16, 1943.    J. S. KOPAS    2,311,055
TESTING MACHINE
Filed May 17, 1940    2 Sheets-Sheet 1
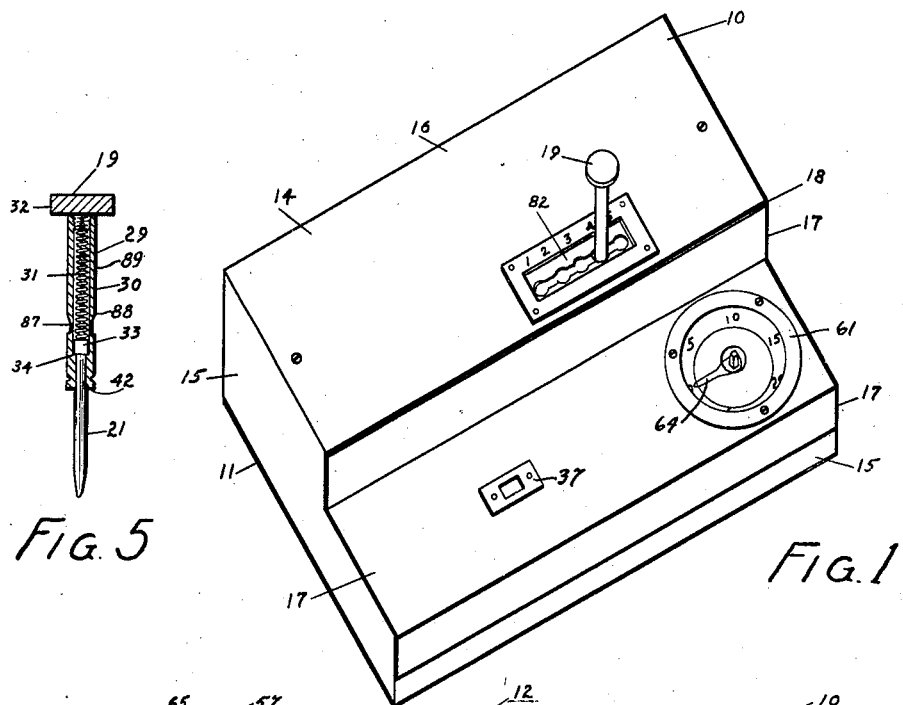
Fig. 5
Fig. 1
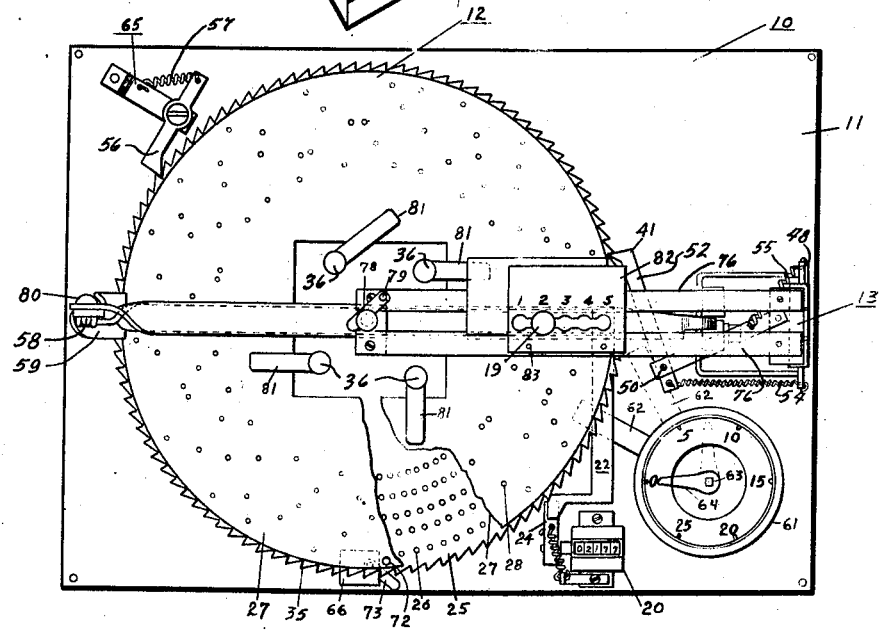
Fig. 2
INVENTOR.
JOSEPH S. KOPAS
BY Woodling and Krost.
ATTORNEY.

Feb. 16, 1943. J. S. KOPAS 2,311,055
TESTING MACHINE
Filed May 17, 1940 2 Sheets-Sheet 2
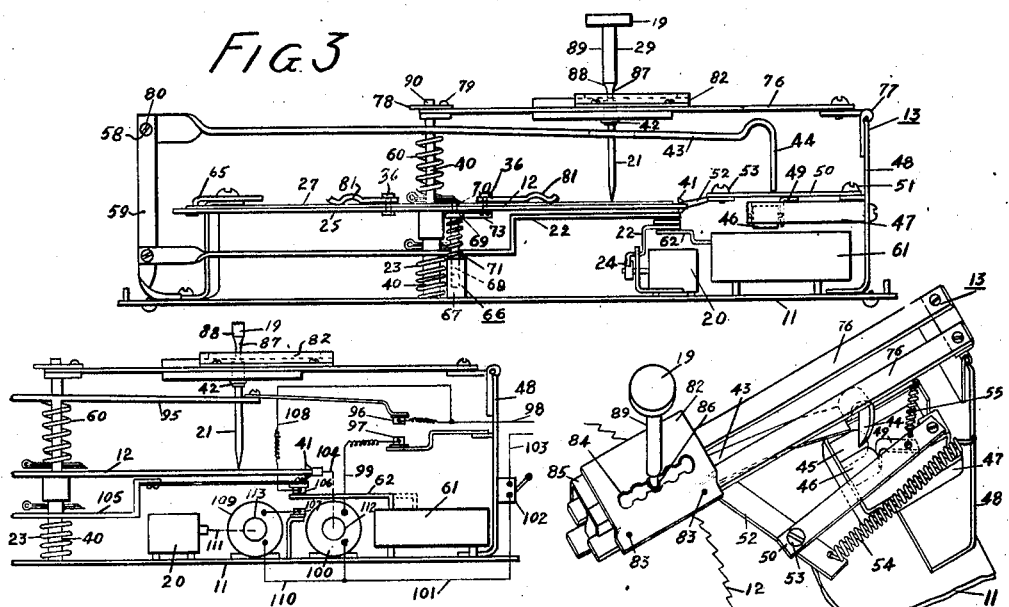
INVENTOR.
JOSEPH S. KOPAS
BY Woodling and Krost
ATTORNEY.

Patented Feb. 16, 1943

2,311,055

UNITED STATES PATENT OFFICE 2,311,055

TESTING MACHINE

Joseph S. Kopas, Cleveland, Ohio

Application May 17, 1940, Serial No. 335,802

18 Claims. (Cl. 35—22)

This invention relates to testing machines and more particularly to machines adapted to grade tests of the multiple choice type and to limit the time allowed for the tests.

In industry and business more and more attention is being directed to the careful selection of employees. Aptitude tests are being given to many persons seeking jobs and the tests compiled for giving these tests range from comprehensive ones designed to pick executive type employees to simple ones designed to other less important or manual jobs.

The questions involved in these tests have been chosen by educators and psychologists and are becoming available to business and industry in printed form. However, for a particular company to test its applicants for jobs even with the printed test forms would require a staff of persons to time the applicants and grade the papers.

As many of the tests are comprised of true and false questions and multiple choice questions it is possible to automatically record the score of the person taking the test; hereafter called the testee.

As a true and false type of question is merely another form of a multiple choice question in which there is a 50 percent chance of guessing the correct answer as compared to a 20 percent chance of guessing the correct answer in a question having 5 answers presented to the testee, I shall limit this description to the multiple choice type of question. It is to be understood, however, that all tests in which the testee is faced (1) with choosing one answer from a number of given answers, (2) with indicating a position indicative of an answer as per instructions in the tests, and (3) with selecting one of a number of given preferences, are construed to be multiple choice tests.

The machine herein illustrated and described is adapted to score multiple choice tests wherein five answers to each question are presented to the testee and he is to choose the one correct answer. It is obvious that more than one right answer to a question may be included in the five answers to a question and that more than five or less than five choices may be given to the testee.

An object of my invention is to provide a machine for recording the number of correct answers a testee selects in a multiple choice test.

Another object of my invention is to automatically time a test and to prevent correct answer from being recorded after the set time has elapsed.

A further object of my invention is to provide a machine having key means corresponding to each possible answer in a multiple choice test and to cause the actuation of the key means to record a correct answer if the testee is correct in his choice of answers to the first question and to change the machine to render it responsible to the correct answer to a second question.

A still further object of my invention is to provide a machine having pattern means which prevent the testee's selection of a wrong answer from being recorded and which may be easily changed to accommodate the machine for other tests.

Another object of my invention is to provide a machine in which one answer key may be used to indicate a testee's answer to a plurality of choices.

Still another object of my invention is to provide a machine having an answer key for each of a plurality of choices of answers and to prevent more than one key from being depressed at a time.

A further object of my invention is to provide a testing machine with a timer which can be set for various time intervals and which, when the time interval has elapsed, will prevent further scores from being registered.

Another object of my invention is to provide a scoring machine which electrically registers a testee's correct answer to a multiple choice question and which will successively position the answers to a series of questions where the testee may get credit for correctly answering them.

Another object of my invention is to cause a series of answer grading holes to pass next to an answer key whereby a testee may successively indicate his answer to the questions and to cause the answer grading holes to be positioned by the testee actuating the answer key.

Other objects and a fuller understanding of my invention may be had by referring to the following description and claims, taken in conjunction with the accompanying drawings, in which:

Figure 1 is an isometric view of my machine with a cover on;

Figure 2 is a plan view of my machine with the cover off;

Figure 3 is a side elevational view of Figure 2;

Figure 4 is an enlarged isometric view of a portion of my device and particularly the mechanism for advancing the parts to correspond to successive questions of the test;

Figure 5 is a cross-sectional view of the telescoping key;

Figure 6 is a side elevation somewhat similar to Figure 3 but showing an electrical machine;

Figure 7 is an isometric view of another modified form of my invention showing electrical connections for counting the answers and for actuating the machine;

Figure 8 is a cross-sectional view of a modified form of answer key means; and

Figure 9 is a fragmentary portion of a test sheet constituting questions and multiple answers.

With reference to Figures 1 and 2 of the drawings, my invention comprises a device for recording correct answers to a multiple choice test and is indicated generally by the reference character 10. The device 10 is comprised of a base 11 to which is attached a revolvable disc or pattern means 12 and an actuating means 13 for revolving the pattern means 12. A cover 14 is placed over the pattern means 12 and the actuating means 13 to prevent the person who is taking the test from seeing the mechanism.

The cover 14 comprises side wall means 15 which fit against the base 11 and a top portion 16 which is affixed to the side wall means 15. A hingable or removable front portion 17 is provided and attached to the top portion 16 along the hinge line 18, whereby the operator giving the test may lift up the front portion of the cover 14 and set the machine for the testee. The entire cover 14 with its side walls 15 is shown removed in Figures 1, 3 and 6 and thus Figure 2 is a plan view of the internal parts of the machine with the cover off and Figures 3 and 6 are elevational views of the internal parts of the machine with the cover off.

Projecting through the top portion 16 is a key means 19 which is positionable in a plurality of positions 1, 2, 3, 4 and 5 corresponding to the number of choices of answers the testee has to each question in the test. The key means 19 is adapted to be actuated downwardly by the testee in any one of the five positions depending upon which position he thinks corresponds to the correct choice of answers to a particular question. For instance if the question on the test was: Which one of the five words following means the opposite of north– (1) pole, (2) equator, (3) south, (4) east, (5) west. The correct answer is south so the testee would slide the key means 19 to the position indicated by (3) and depress the key downwardly. This would give him a correct answer. Depressing the key 19 in positions (1), (2), (4) or (5) would not give the testee a correct answer.

The correct answer is scored on a counter mechanism 20 in the following manner. See Figure 3. When the key means 19 is depressed in a correct answer position an end portion 21 of the key means passes through a hole 28 in the pattern means 12 and engages a spring biased arm 22 and pushes it downwardly against the spring 23. The spring biased arm 22 engages a counter arm 24 and actuates the counter mechanism 20 to record a correct answer. Upon the testee releasing the key means 19 the compressed spring 23 pushes the spring biased arm 22 back into its original position and the counter arm 24 is returned to its original position by a spring within the counter mechanism 20.

The pattern means 12 permits a correct answer to be recorded and prevents a wrong answer from being recorded. The pattern means comprises a circular disc 25 of metal or other suitable material having many holes 26 therethrough. In the illustrated disc 25 there would be 500 holes 26. The five holes in each radial line correspond to the five possible answers to a question and each of the 100 radial lines correspond to a question in the test. Positioned on the circular disc 25 and comprising part of the pattern means is an indicia disc 27 of cardboard or other suitable material having only one hole 28 in each radial line. The hole 28 in each radial line of the pattern disc 27 alines with one of the five holes 26 in each radial line of the circular disc 25 thereby establishing the position of the alined holes as the only position for that question in which the end portion 21 will pass through the pattern means 12 and record a correct answer on the counter mechanism 20. If the key means 19 was depressed in any of its positions except the one in which the end portion 21 would pass through the pattern means 12 the spring biased arm 22 would not be actuated to cause a score to be recorded as the imperforate part of the pattern disc 27 would prevent the end portion 21 of the key means 19 from engaging the spring biased arm 22. To prevent the end portion 21 of the key means from penetrating the pattern disc 27 when there is no "correct answer" perforation and to prevent the testee from being able to "feel" a correct answer by partially depressing the key means 19 in each of its five possible positions, I have made the end portion 21 so that it will telescope into the upper part 29 of the key means.

The telescoping key means 19 may be seen in detail in Figure 5 in which the upper portion 29 is comprised of a hollow tube portion 30 with a spring 31 therein and a cap 32 screwed into the hollow tube portion 30. The cap 32 constitutes a broad portion against which the testee's thumb or finger may be placed to depress the key means. The end portion 21 of the key means 19 is held into the lower end of the tube portion 30 by means of an outwardly extending shoulder portion 33 on the end portion 21 engaging an inwardly extending shoulder portion 34 on the lower end of the tube portion 30. The spring 31 is positioned between the cap 32 and the telescoping end portion 21 thereby keeping the end portion extended except when a testee depresses the key 19 when it is in a "wrong answer" position. In this event the spring 31 is compressed and the end portion 21 does not push through the cardboard pattern disc 27. The spring 31 must be strong enough to resist compression while the key means 19 is depressed in a "correct answer" position in order to depress the spring biased arm 22 against the force of the spring 23 and actuate the recorder 20.

While I have described the pattern means 12 as comprising a metal disc 25 with 500 holes therein and a cardboard pattern disc 27 with 100 "correct answer" holes therein it is to be understood that these two discs may easily be combined into one by making the pattern disc 27 of metal. The reason for illustrating the pattern means 12 as two discs 25 and 27 is to facilitate exchanging the pattern disc 27 for each different examination given. However, the metal disc 25 may be made exchangeable and thereby do away with the cardboard pattern disc 25.

The circular metal disc 25 is provided with a plurality of peripheral teeth 35, one tooth for each radial line of five holes. In other words, the rotation of the disc 25 about an axis 40 may be caused by a dog 41 pushing the disc around one tooth at a time. Each time the dog 41 pushes the disc 25 the distance of one tooth space a new radial line of holes is positioned directly beneath the line of key positions 1, 2, 3, 4 and 5. The cover 14 may be provided with a window 37 through which an inspection may be made to ascertain that the circular metal disc 25 is properly indexed and advanced upon the actuation of the dog 41.

The pattern means actuating device 13 is adapted to actuate the dog 41 and rotate the pattern means 12 to successively position the answers to successive questions between the key means 19 and the counter arm 24. Upon the testee depressing the key means 19 the pattern means is rotated whether the key means actuates the counter mechanism 20 to record a correct answer or not. The rotation of the pattern means 12 upon each depression of the key means 19 is accomplished by a shoulder 42 on the upper part 29 of the key means 19 engaging a spring biased wedge arm 43 and forceably pushing a wedge shaped end portion 44 thereof between two rollers 45 and 46. The roller 45 is rotatably attached to a frame 47 which is attached to an upstanding leg 48 which is in turn attached to the base 11. The roller 46 is rotatably attached to an arm 49 which is attached to a pivotal arm 50. The pivotal arm 50 is pivotally attached at one end to the upstanding leg 48 by means of a screw 51 or other suitable means, and at the other end to a dog arm 52 by means of the screw 53. Attached to one end of the dog arm 52 is the dog 41 and attached to the other end is one end of a spring 54. The other end of the spring 54 is attached to the upstanding leg 48. The force of the spring 54 pulling on one end of the dog arm 52 keeps the dog 41 tightly against the edge of the pattern means 12. Between the pivotal arm 50 and the upstanding leg 48 is a spring 55 biased to pull the roller 46 toward the roller 45.

When the spring biased wedge arm 43 is actuated by the key means 19 being depressed, the wedge shaped end portion 44, see Figure 4, passes between the rollers 45 and 46. As the roller 45 cannot move sideways the roller 46, which is attached to the pivotal arm 50, is moved causing the arm 50 to stretch the spring 55 and causing the dog 41 to move around the circumference of the pattern means 12 approximately the distance of one tooth space. When the key means 19 is released from its depressed position the spring 60 biasing the wedge arm 43 forces the wedge arm 43 into its initial position thereby removing the wedge shaped end portion 44 from between the rollers 45 and 46. With the removal of the wedge shaped end portion 44 from between the rollers 45 and 46 the spring 55 pulls the rollers together and through the pivotal arm 50 and the dog arm 52 causes a counterclockwise movement of the dog 41 against the set of the teeth 35 which rotates the pattern means 12 and places another radial line of five answer positions between the key means 19 and the spring biased arm 22.

It will be seen from the foregoing description that upon the depression of the key means 19 to indicate the testee's choice of answers to a first question the pattern means 12 is rotated to position the answer to the next successive question whether the testee selected the correct answer to the first question or not, and that if the testee selected the correct answer to the first question the end portion 21 of the key means passed through the pattern means and actuated the counter mechanism 20 to record a correct answer. If the testee did not know the correct answer to the first question the end portion 21 of the key means 19 engaged an imperforate portion of the cardboard pattern disc 27 and caused the end portion 21 to telescope into the upper portion 29 of the key means against the force of the spring 31. The force of the spring 31 is such that in the event the testee chooses the correct answer and upon the end portion 21 engaging the spring biased arm 22 the spring 23 will compress before the spring 31 and is such that in the event that the testee chooses the wrong answer the spring 31 will compress before the end portion 21 penetrates through an imperforate portion of the cardboard disc 27. In any event upon each depression of the key means 19 a spring is compressed. This prevents the testee from getting correct answers by "feeling." By "feeling" I mean positioning the key means in the first answer position and depressing the key means slowly to feel whether the end portion 21 engages an imperforate "wrong answer" portion or a perforate "correct answer" portion of the pattern disc 27, and if it engages a "wrong answer" portion moving the key means to the second answer position and depressing it slowly and so on until a correct answer is "felt."

A timing mechanism indicated generally by the reference character 61 is attached to the base 11 near the counter mechanism 20. The timing mechanism comprises a spring wound clock works having a face divided into five minute intervals, and an arm 62. The illustrated mechanism is adapted to time tests up to 30 minutes in length and is set and wound by the operator placing a key on a square hub 63 and turning a hand 64 to the desired time interval. Turning the hub of the clock moves the arm 62 to the dotted position shown in Figure 2. The initial position of the arm 62 is underneath the spring biased arm 22 where it prevents the spring biased arm 22 from actuating the counter arm 24 to record a correct answer. The dotted position of arm 62 is away from the spring biased arm 22 to allow the spring biased arm to actuate the counter mechanism. When the arm 62 is moved to the dotted position the time begins to run against the testee. If the hand 64 was turned clockwise around the face to zero the testee has 30 minutes in which to answer questions on the test. At the end of the 30 minute time interval the arm 62 snaps from its dotted position to its position under the spring biased arm 22 and prevents further correct answers from being recorded on the counter mechanism 20.

I have provided a catch device for preventing the pattern means 12 from rotating in a reverse direction during the time that the dog 41 is being pulled back by the action of the wedge arm 43 between the rollers 45 and 46. The catch device is indicated by the reference character 65 and comprises a ratchet member 56 attached to the base 11 and urged against the teeth of the circular metal disc 25 by means of a spring 57. The ratchet member 80 is arranged to stop rotation of the pattern means 12 in a reverse direction.

I also provide safety means to prevent the pattern means 12 from rotating more than 360 degrees for each testee. This is indicated generally by the reference character 66 and is designed to prevent a testee from depressing the key means 100 times in the number 1 answer position and then depressing it 100 times in the number 2 answer position and so on until he has depressed the key means in all 500 of the possible positions, thereby scoring a perfect grade. It also prevents a testee from inadvertently getting a higher score than he should by pushing the key means several times in any position after he has finished answering his 100 questions. This safety means comprises a tube-like shaft 67 attached to the base 11 and positioned under the front edge of the pattern means 12. Slidably positioned in the hollow portion of the tube-like shaft 67 is a solid shaft 68 having a shoulder portion 69 and a pin portion 70 at its upward end. A spring 71 is positioned around the solid shaft 68 and between the tube-like shaft 67 and the shoulder portion 69 to bias the solid shaft and the pin upwardly, causing the pin 70 to bear against the pattern means 12. A hole 72 is provided in the pattern means near the outside edge thereof whereby upon the pattern means revolving until the hole 72 is above the spring biased pin 70 the pin will be pushed into the hole until the shoulder 69 engages the pattern means. This prevents the actuating device 13 from turning the pattern means. A handle 73 is attached to the shoulder 69 to provide a convenient means for the operator to compress the spring 71 and withdraw the pin 70 from within the hole 72. After the pin 70 has been withdrawn from the hole 72 the operator rotates the pattern means 12 one tooth space and the answer to the number one question on the test is then positioned under the key means 19 and the pin 70 will be held down by the pattern means.

My device may be used with many different tests as the pattern disc 27 is removable and another may be put in its place. It is therefore convenient for a large company to keep a printed examination sheet and a pattern or answer disc 27 corresponding to the examination sheet for each position in the company and when they find it necessary to give an applicant a test to see whether he is suited to the particular job for which he is applying, all they need to do is place the proper pattern disc 27 on the machine, depress the handle 73 to withdraw the pin 70 from the hole 72 and rotate the pattern means 12 until the first question is under the key means 19 and turn the timing mechanism hand 64 to the proper time interval. The device may then be enclosed by the cover 14. The operator may then attend to other business while the testee take the test.

To facilitate the positioning of different pattern discs 27 on the machine I have made the pattern means removable from the shaft 40 on which it turns. To remove the pattern disc 27 the arm 76 upon which the key means 19 are slidably positioned is hingably removable from above the disc 27. To remove the key supporting arm 76 the operator rotates a locking finger 78 in a clockwise direction about the pivot point 79. As the locking finger 78 is adapted to fit under a shoulder 90 on the shaft 40, turning it in a clockwise direction releases the catch and the key supporting arm 76 may be swung through 180 degrees about the hinge 77 and out of the way of the pattern disc 27. The spring biased wedge arm 43 may then be swung about a hinge point 80 until it is out of the way of the pattern disc 27. The hinge point 80 may comprise a screw and nut 58 supported by an upright member 59 anchored to the base 11. Arms 81 which serve to hold the indicia disc 27 to the metal disc 25 are then swung off of the pattern disc 27 and the indicia disc 27 may be lifted off and a new one put on. The arms 81 may be constructed of resilient material and they function as spring clips to hold the pattern disc 27 down against the circular metal disc 25. As illustrated, the resilient arms 81 may be pivotally fastened to the circular metal disc 25 by means of pivot members 36.

The key means 19 which is shown in detail is slidably mounted on the key supporting arm 76 which extends from the upstanding leg 48 to the shaft 40 by means of a plate 82. The key supporting arm 76 is bifurcated and the plate 82 is suitably attached to one of the two parallel members by such means as screws 83 and extends over the other of the parallel members. The plate 82 has a slot 84 therein with five enlarged areas each of which corresponds to one of the five answer positions in which the key means can be placed. Under the plate 82 there is slidably positioned a slidable member 85 having a hole 86 therein large enough for the shank portion 89 of the key means to pass through. The key means 19 has a constricted neck portion 87 in its shank positioned so that upon the spring biased wedge arm 43 pushing the key means 19 into its original position the constricted neck 87 is adjacent the plate 82. In this position the key means 19 may be easily slid from one answer position to another and when the key 19 is depressed in one of the answer positions it will pass downwardly into the device. If a testee attempts to depress the key means 19 when it is not squarely in one of the answer positions a shoulder 88 between the neck 87 and the shank 89 will engage the edges of the slot 84 and prevent it from passing into the device. Also, if the testee attempts to slide the key means 19 from one answer position to another without releasing it and allowing the spring biased wedge arm 43 to actuate the key means 19 to its original position the shank portion 89 will engage the slot 84 between the enlarged portions and prevent the sliding thereof. This is important as it is essential that the testee release the key means and allow it to be positioned in its original position, as in so being positioned the wedge 44 is withdrawn from between the rollers 45 and 46 and the pattern means 12 is rotated to the next successive position.

In Figure 6 I have illustrated a device somewhat similar to the device illustrated in Figures 1, 2, 3, 4 and 5 but showing a means for electrical actuation of the pattern means 12 and for electrically recording the correct answers.

Upon a testee depressing the key means 19 in any of the five answer positions the shoulder 42 engages a spring biased contact arm 95 and establishes a connection between the contacts 96 and 97. Connection between the contacts 96 and 97 makes a circuit from the supply wire 98 through the contacts 96 and 97, the wire 99, an electrical device 100 such for example as a solenoid shown for clarity as a circle representing the coil with a plunger 112, the wire 101, a switch 102, and the return wire 103. The making of the circuit energizes the solenoid 100 and the solenoid, through suitable power transmitting means 104 illustrated by the dash-dot-line, actuates the dog 41 to rotate the pattern means one tooth space. The suitable power transmitting means 104 may be substantially the same as the dog arm and spring arrangement for actuating the dog 41 in Figures 2, 3 and 4. Thus, the solenoid may actuate the dog arm 52 with the rollers and other parts removed. If the testee actuates the key means 19 in a "correct answer" position the end portion 21 of the key means passes through the pattern means 12 in the heretofore described manner and engages and depresses the spring biased counter arm 105 to cause a contact 106 to engage a contact 107. The engagement between contact 106 and 107 establishes a circuit from the supply wire 98 through the wire 108 to the contacts 106 and 107, through an electrical device 109 such, for example, as a second solenoid having a plunger 113, through wires 110 and 101, the switch 102 and the return wire 103. The establishment of the circuit through the second solenoid 109 causes the movable plunger of the solenoid 109 to actuate the counter mechanism 20 by means of suitable power transmitting means 111 illustrated by the dash-dot-line and record a correct answer for the testee. The engagement between contact points 106 and 107 can only be made while the clock arm 62 is in its retracted position which is shown in dotted lines in Figure 6. The clock arm 62 is in this position only when time is running against the testee. When the time interval set by the operator has elapsed the clock arm 62 snaps into position between the contacts 106 and 107 and prevents the testee from getting credit for any further answers.

Another embodiment of my invention is shown in Figure 7 in which the pattern means is an endless belt 115 which runs on two rollers 116. Mechanical means such as is shown in Figures 1, 2, 3 and 4 may be used to actuate the endless belt 115 and to record the correct answers but I have shown it operable by electric means similar to the means illustrated in Figure 6.

Figure 8 illustrates another type of key means which may be used and which comprises a plurality of keys 120, 121, 122, 123, and 124, each in a fixed position and each corresponding to an answer position of the aforedescribed key means 19. The plurality of keys 120, 121, 122, 123 and 124 are depressably attached to the key supporting arm 76 by means of an attaching plate 125. Connected to the attaching plate 125 by means of supports 126 is a rectangular box 127. Inside the box are four balls 128, 129, 130 and 131. The sum of the lengths of the four diameters of the balls is not quite equal to the length of the box 127 and the balls are positioned with respect to the 5 keys that each key may pass into the box 127 by means of holes 132 therein, push the balls aside and pass out of the holes 133, through the pattern means 12 and engage the spring biased arm 22 which would be placed thereunder as previously described. The balls in the box 127 are of sufficient size that two keys cannot pass through the box at the same time. In Figure 8, key 121 is illustrated engaging the pattern means 12. While the key 121 is in this position none of the other keys 120, 122, 123, 124 can push the balls 128, 129, 130, 131 aside enough to allow them to pass through the box 127. This type of key means may be used with the mechanical device as illustrated by Figures 1, 2, 3 and 4 or with the electrical devices illustrated in Figures 6 and 7.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device for scoring multiple choice tests comprising, in combination, pattern means having a plurality of holes therein, each hole corresponding to a correct answer to a question of multiple choice tests, key means on one side of the means and operable by the person taking the test to indicate his preference of the multiple choice answers, recording means operable from the other side of the means and adapted to record a correct answer when engaged by the said key means after passing through a correct hole in the means which corresponds to a correct answer, and means governed by the said key means for advancing a next successive hole corresponding to the correct answer to a next successive question upon each operation of the said key means.

2. A device for scoring multiple choice tests comprising, in combination, pattern means having successive positional portions, each said positional portions being perforate at a point corresponding to a correct answer and imperforate at a plurality of points corresponding to wrong answers, key means located on one side of the pattern means and selectively positionable with reference to said points corresponding to the right and wrong answers and actuated by the person taking the test to indicate his answer, recording means, means positioned on the opposite side of said pattern means and actuated by a portion of the key means passing through the perforation to record a correct score on the recording means, and means actuated by the key means for advancing the said pattern means to successively locate the positional portions with reference to the key means.

3. A device for indicating the number of questions a person answers correctly in a multiple choice test comprising in combination, key means operable by the person to indicate his choice of answers to a first question, pattern means positioned below the said key means and having one perforation therein corresponding to the correct answer to the said first question, recording means, actuating means positioned below the said pattern means for actuating the recording means, said recording means being actuated by the said key means passing through the perforation in the said pattern means and engaging the said actuating means, and means actuated by the said key means for advancing the said pattern means to position a perforation corresponding to the correct answer to the next succeeding question below the said key means.

4. A scoring machine for multiple choice tests comprising, in combination, telescopic key means depressable in a number of positions, the number of positions corresponding to the number of choices of answers for the questions, pattern means positioned below the key means and having a plurality of holes therein, each hole corresponding to the correct answer for one question, recording means, actuating means positioned below the pattern means for actuating the recording means, said key means upon being depressed in the position corresponding to the correct answer to a question passing through a hole in the said pattern means and actuating the actuating means and the recording mechanism and said key means upon being depressed in a position corresponding to an incorrect answer to a question telescoping within itself upon contact with the said pattern means, and means movable by said key means for advancing the said pattern means upon the key means being depressed.

5. A machine for scoring and timing a test comprised of a plurality of questions each having multiple choice answers comprising, in combination, key means having a position corresponding to each of the multiple choice answers, pattern means having a plurality of holes therein, each hole corresponding to the correct choice of the multiple choice answers for one of the plurality of questions, recording means, said recording means being actuated by the operator choosing the correct answer to a question and pressing the said key means into the correct hole in the said pattern means and transmitting movement to the said recording means, means associated with said pattern means and actuated by said key means on the opposite side of the pattern means for advancing said pattern means to successively position the plurality of holes with reference to the key means, and timing means adapted to be set to prevent the said recording means from recording answers after the set period of time has elapsed.

6. A scoring machine for multiple choice tests comprising, in combination, slidable telescoping key means depressible in a number of positions corresponding to the number of choices of answers for the questions, pattern means positioned below the key means and having a plurality of holes therein, each hole corresponding to the key position for the correct answer to one of the questions in the test, recording means, actuating means for actuating the recording means positioned below the pattern means and adapted to be engaged and actuated by the key means when the key means has been slid to the "right-answer" position and the key pressed downwardly, and means actuated by said key means for advancing said pattern means, said indicia means preventing said key means from engaging said recording means when said key means is in a "wrong-answer" position and said key telescoping upon being pressed downwardly while in said "wrong-answer" position.

7. A machine for scoring successive questions in a multiple choice test comprising, in combination, telescoping key means depressible in a plurality of positions, each of said positions corresponding to one of said multiple choice answers, movable pattern means with a plurality of holes therein, each of said holes corresponding to a correct answer to a question in the test and one of said holes being positioned beneath the said key means, recording means for recording correct answers, said key means upon being depressed in a position corresponding to a wrong answer telescoping within itself and upon being depressed in a position corresponding to a correct answer projecting through said correct answer hole and actuating said recording means, and means actuated by the depressing of said key means for advancing said pattern means to position the next successive correct answer hole beneath the said key means.

8. A machine for scoring successive questions in a multiple choice test comprising, in combination, telescoping key means depressible in a plurality of positions, each of said positions corresponding to one of said multiple choice answers, movable pattern means with a plurality of holes therein, each of said holes corresponding to a correct answer to a question in the test and one of said holes being positioned beneath the said key means, recording means for recording correct answers, said key means upon being depressed in a position corresponding to a wrong answer telescoping within itself and upon being depressed in a position corresponding to a correct answer projecting through said correct answer hole and actuating said recording means, means actuated by the depressing of said key means for advancing said pattern means to position the next successive correct answer hole beneath the said key means, and timing means adapted to prevent the recording means from recording a correct answer after a set time interval has elapsed from the start of the test.

9. A machine for scoring and timing multiple choice tests comprising, in combination, shanked key means depressible in a plurality of positions to indicate the operator's choice of the multiple answers, recording means for recording a correct choice by the operator, pattern means having a plurality of holes therein, each of said holes corresponding to the correct answer to one of the questions on the test, said pattern means being positioned between said key means and said recording means and having one hole substantially directly in line with said key means whereby upon the operator depressing the said key means in the position corresponding to the correct answer the shank of the said key means will pass through the said hole in the said pattern means and actuate the recording means, said shank means being adapted to telescope upon the said key means being depressed in a position corresponding to an incorrect answer to a question, means for advancing said pattern means to place another "correct-answer" hole substantially directly in line with said key means upon each depression of the said key means, and timing means for preventing the recording means from recording an answer after a set interval of time has passed from the start of the test.

10. A machine for scoring a test comprised of a plurality of questions each having multiple choice answers comprising in combination, a plurality of key means each corresponding to one of the multiple choice answers, pattern means having a plurality of holes therein, each hole corresponding to the correct choice of the multiple choice answers for one of the plurality of questions, recording means, said recording means being actuated by the operator choosing the correct answer to a question and depressing the key of the said plurality of key means which corresponds to the said chosen answer, said correctly chosen key means upon being depressed projecting through the hole in the pattern means and actuating the said recording means, means engaging the said pattern means and actuated by the said key means for advancing the said pattern means and means associated with the said key means for preventing more than one key from being depressed at a time.

11. A machine for scoring a test comprised of a plurality of questions each having multiple choice answers comprising in combination, a plurality of key means each corresponding to one of the multiple choice answers, pattern means having a plurality of holes therein, each hole corresponding to the correct choice of the multiple choice answers for one of the plurality of questions, recording means, said recording means being actuated by the operator choosing the correct answer to a question and depressing the key of the said plurality of key means which corresponds to the said chosen answer, said correctly chosen key means upon being depressed projecting through the hole in the pattern means and actuating the said recording means, means engaging the said pattern means and actuated by the said key means for advancing the said pattern means, means associated with the said key means for preventing more than one key from being depressed at a time, and timing means adapted to be set to prevent the said recording means from recording correct answers after the said set period of time has elapsed.

12. A machine for scoring a multiple choice test made up of a plurality of questions comprising, in combination, spring biased recorder means for indicating an operator's correct choice of answers to a question, spring biased telescoping key means having a position corresponding to each of the multiple choices, pattern means positioned between said key means and said recorder means, said pattern means having a plurality of holes therein, each hole corresponding to the correct answer to one of the questions in the test, said spring biased telescoping key means having an end adapted to pass through a "correct answer" hole in the said pattern means and actuate the said spring biased recorder means when the operator depresses the said key means in its "correct answer" position, the spring in the spring biased telescoping key means being strong enough to resist telescoping while said key means actuates said recorder means, and said pattern means causing the said end of the said key means to telescope into the said key when the operator depresses the said key means in a "wrong answer" position, and means operable by the said key means to advance the pattern means to position the "correct answer" holes to successive questions between the said key means and the said recorder means.

13. A machine for scoring a multiple choice test made up of a plurality of questions comprising, in combination, spring biased recorder means for indicating an operator's correct choice of answers to a question, spring biased telescoping key means having a position corresponding to each of the multiple choices, pattern means positioned between said key means and said recorder means, said means having a plurality of holes therein, each hole corresponding to the correct answer to one of the questions in the test, said spring biased telescoping key means having an end adapted to pass through a "correct answer" hole in the said pattern means and actuate the said spring biased recorder means when the operator depresses the said key means in its "correct answer" position, the spring in the spring biased telescoping key means being strong enough to resist telescoping while said key means actuates said recorder means, and said pattern means causing the said end of the said key means to telescope into the said key when the operator depresses the said key means in a "wrong answer" position, means operable by the said key means to advance the pattern means to position the "correct answer" holes to successive questions between the said key means and the said recorder means, and timing means adapted to be set to prevent the said means from recording a correct answer after the set period of time has elapsed.

14. A machine for scoring a multiple choice test made up of a plurality of questions comprising, in combination, spring-biased electrical recorder contact means for indicating an operator's correct choice of answers to a question, spring biased telescoping key means having a position corresponding to each of the multiple choices, pattern means positioned between said key means and said recorder contact means, said pattern means having a plurality of holes therein, each hole corresponding to the correct answer to one of the questions in the test, said spring biased telescoping key means having an end adapted to pass through a "correct answer" hole in the said pattern means and actuate the said electrical recorder contact means when the operator depresses the said key means in its "correct answer" position, the said actuation of the recorder contact means electrically recording a correct answer to a question, the spring in the spring biased telescoping key means being strong enough to resist telescoping while the said key means actuates said recorder contact means, and said pattern means causing the said end of the said key means to telescope into the said key when the operator depresses the key means in a "wrong answer" position, and electrical means operable by the said key means to advance the pattern means to position the "correct answer" holes to successive questions between the said key means and the said recorder contact means.

15. A device for scoring multiple choice tests comprising, in combination, pattern means having a perforate location corresponding to the correct answer to a first question and having a plurality of imperforate locations corresponding to the incorrect answers to the said first question, key means on one side of the said pattern means and having an end portion adapted to telescope within the key means, recording means on the other side of the said pattern means adapted to record a correct answer to a question, said key means being slidable to position the said end portion in line with a location on the pattern means corresponding to one of the multiple choices of answers to the question and depressable to indicate the answer, the end portion of the said key means when said key means is depressed in a "correct answer" position passing through the perforate location in the pattern means and actuating the said recording means and the end portion of the key means when said key means is depressed in a "wrong answer" position engaging the pattern means in an imperforate location and telescoping within itself, and means for advancing the said pattern means upon each depression of the said key means to position the answer to a second question between the said key means and the said recorder means.

16. A machine for scoring a multiple choice test and recording the results comprising, in combination, pattern means having a surface portion, a plurality of openings therein, each opening corresponding to the correct choice of the multiple choice answer, recorder means for indicating an operator's answer, manual means operable by said operator to indicate his choice of answers to a question, telescopic means having relatively movable parts actuated by the manual means, one of said parts being positioned to pass through a correct opening when said correct opening is in alignment therewith and operate the recorder means, resilient means engaging the parts of the telescopic means to urge them in an extended position, said spring compressing when said one of said parts of the telescopic means engages the surface portion of the pattern means.

17. A machine for scoring a multiple choice test comprising, in combination, pattern means having a surface portion and a plurality of openings, each opening corresponding to the correct choice of the multiple choice answer, manual means operable by an operator to indicate his choice of answers to a question, scoring means responsive to the manual means, said manual means including resilient means and relatively movable parts positioned in operative relation with the pattern means, said relatively movable parts when actuated by the operator in alignment with a correct opening in the pattern means transmitting movement through the resilient means to govern the scoring means, and said relatively movable parts when actuated by the operator moving relative to each other against the restraint of the resilient means upon one of said parts engaging the said surface portion of the pattern.

18. A machine for scoring a multiple choice test comprising, in combination, pattern means having a surface portion and a plurality of openings, each opening corresponding to the correct choice of the multiple choice answer, manual means operable by an operator to indicate his choice of answers to a question, scoring means responsive to the manual means, said manual means including resilient means and relatively movable parts positioned in operative relation with the pattern means, said relatively movable parts when actuated by the operator in alignment with a correct opening in the pattern means, which represents a correct answer, transmitting movement through the resilient means to govern the scoring means, and said relatively movable parts when actuated by the operator moving relative to each other against the restraint of the resilient means upon one of said parts engaging the said surface portion of the pattern and preventing wrong answers from being transmitted to the scoring means.

JOSEPH S. KOPAS.